United States Patent

Warsaw

[15] 3,680,368
[45] Aug. 1, 1972

[54] SYSTEM FOR MEASURING TRACTIVE POWER WITH CONTROLLED APPLICATION OF LOAD

[72] Inventor: Arthur J. Warsaw, Colfax, Ill. 61728

[22] Filed: July 27, 1970

[21] Appl. No.: 58,405

[52] U.S. Cl. ................................................73/117
[51] Int. Cl. ...............................................G01l 5/13
[58] Field of Search........................73/117, 123, 126

[56] References Cited

UNITED STATES PATENTS

| | | | |
|---|---|---|---|
| 2,039,428 | 5/1936 | Lewis | 73/117 |
| 2,496,787 | 2/1950 | Fox | 73/117 X |
| 3,054,287 | 9/1962 | Lewis | 73/117 |

FOREIGN PATENTS OR APPLICATIONS

| | | | |
|---|---|---|---|
| 507,082 | 6/1939 | Great Britain | 73/123 |

*Primary Examiner*—Jerry W. Myracle
*Attorney*—Dawson, Tilton, Fallon & Lungmus

[57] ABSTRACT

The system measures horsepower at the drive wheels of a truck tractor under conditions which very closely simulate actual road conditions. For each set of drive wheels there are a driver roll and an idler roll mounted on a frame for rotatably supporting the drive wheels, and a dynamometer is connected to measure the power transmitted from the tractor drive wheels to the drive roll. A hydraulic cylinder and piston rod unit is mounted to the support frame and extends rearwardly. A flexible link connects the movable end of the hydraulic cylinder and piston rod unit to the fifth wheel on the tractor for forcing the tractor wheels against the driver roll while removing weight from the idler roll — thus transmitting the entire torque at the drive wheel to the driver roll while leaving full control of the applied load in the hands of the operator. The driver roll and idler roll for one set of drive wheels is mounted on a movable chassis for accommodating all wheel bases; and the idler rolls are independently movable relative to their associated driver rolls for controlling the distribution of traction between the driver and idler rolls. In a modification, the pulling angle of the flexible link may be set for further controlling the application of torque to the driven roll.

12 Claims, 11 Drawing Figures

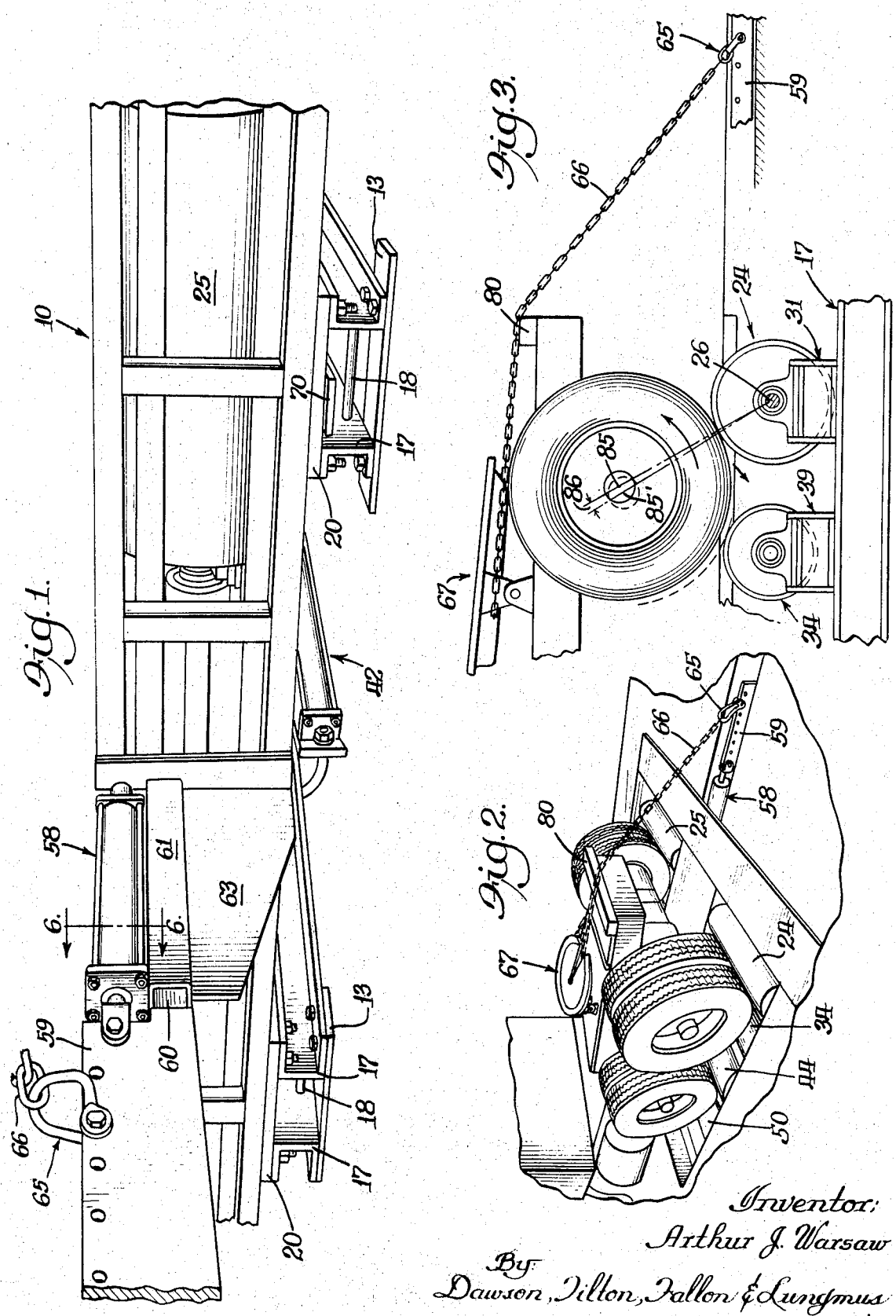

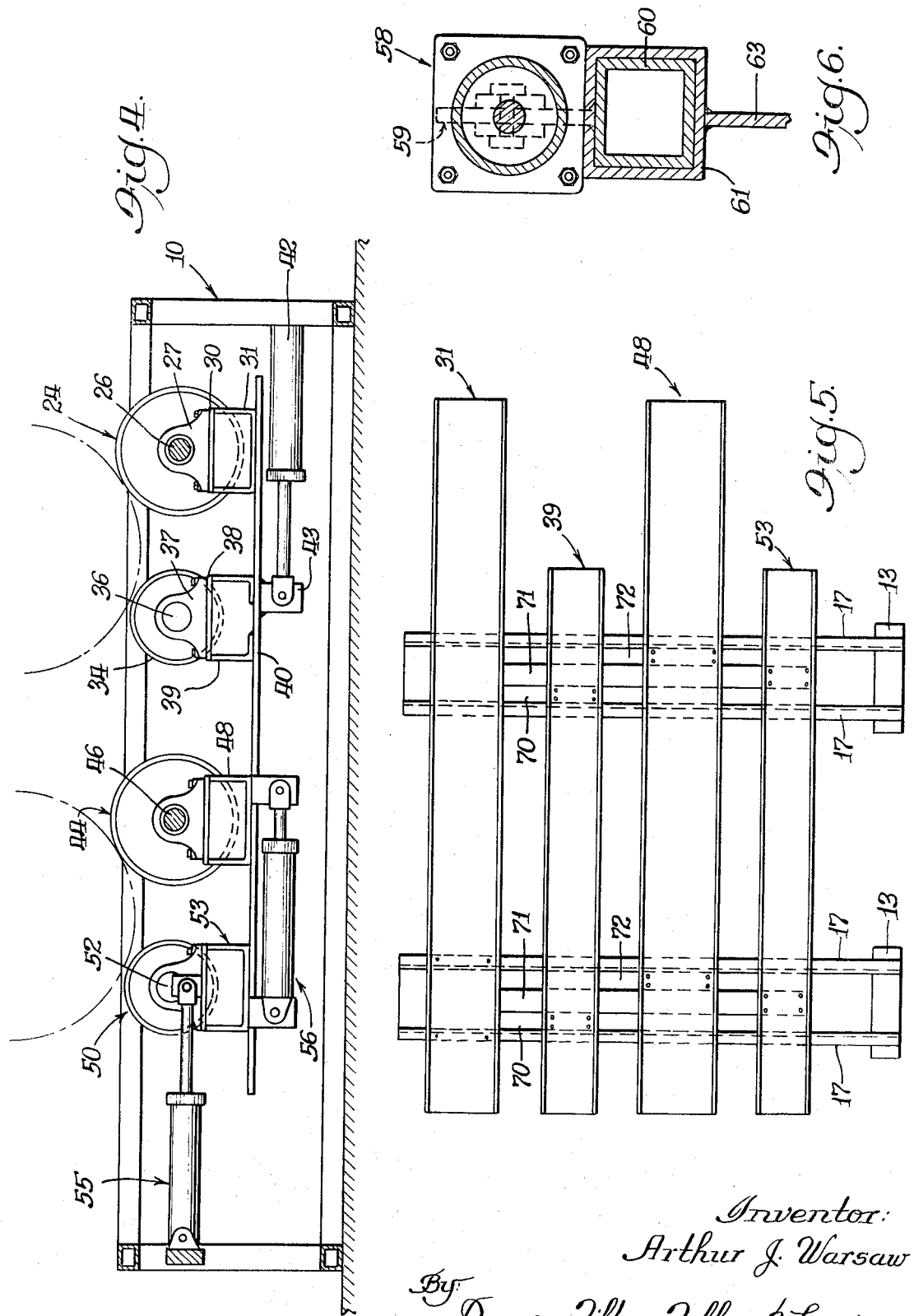

Inventor:
Arthur J. Warsaw
By Dawson, Tilton, Fallon & Lungmus
Attys.

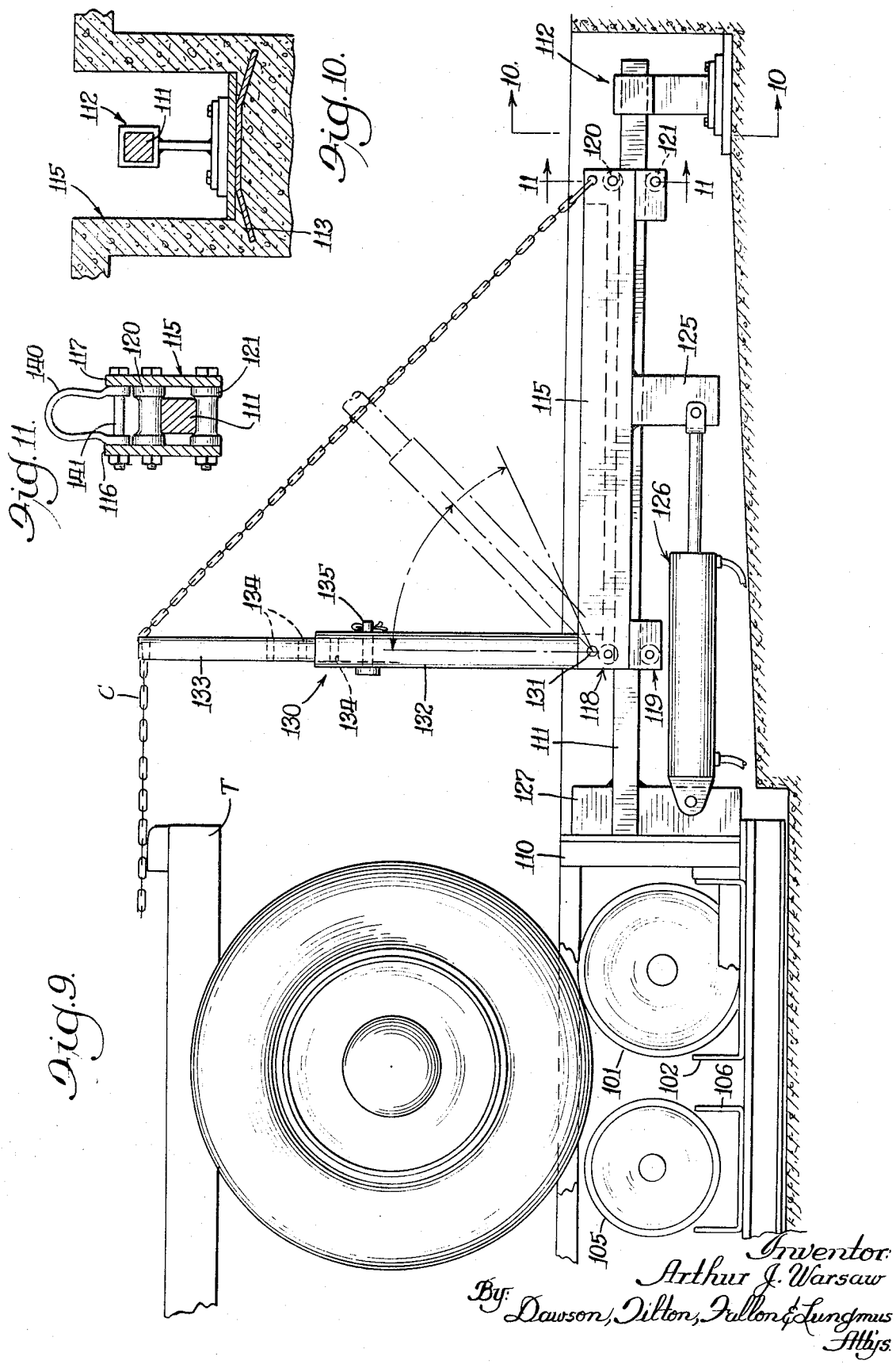

SYSTEM FOR MEASURING TRACTIVE POWER WITH CONTROLLED APPLICATION OF LOAD

BACKGROUND OF THE INVENTION

1. Field of the Invention

The present invention relates to a system for measuring horsepower; and more particularly, to a system for measuring the horsepower-speed characteristic of a tractor for a truck. Normally, the trailer of a truck is attached to the tractor by means of a mounting which is referred to in the art as a "fifth wheel." The tractor is typically provided with two sets of drive wheels, one located immediately behind the other with both sets of drive wheels being secured to a frame extending rearwardly of the truck cabin.

2. Known Systems

Systems are known for measuring the road horsepower of a truck tractor, and it has been found to be desirable to measure the road horsepower right at the drive wheels of the tractor. In one known system there is a driver roll and an idler roll associated with each set of drive wheels on the truck. The driver roll and idler roll are located beneath the drive wheels of the truck in this system, and the drive wheels of the truck rotate the idler roll and driver roll in treadmill fashion so that torque is transmitted from the truck wheels to the drive roll where road horsepower is measured. In this system, however, the idler roll is behind the drive roll, and the upper surface of the drive roll is located above the upper surface of the idler roll so that in an idle position, the weight of the truck is primarily on the idler roll. During operation, the thrust of the vehicle is, of course, forward so that the driven vehicle tries to "climb" over the front driver roll. Escape of the truck from this system is hazardous, although the truck may be secured with a loose chain which will restrain the truck should it escape.

In addition to the safety hazard, these systems are limited in the amount of traction that can be transmitted from the tires to the drive roll by the weight of the tractor. Further, this type of system causes a double working of the tires — that is, the tires of the wheels under test are worked both by the driver roll and by the idler roll; it has been found through experience that such double working will overheat the tires internally. Excessively hot tires create flat spots that may ruin the tire. A further major disadvantage of this type of system is the slippage of the tire on the drive roll to the extent that the tires will become gummy and again damaged by heat. The slippage is caused partly by the fact that the amount of traction that can be transmitted to the rolls is limited by the weight of the tractor and partly by the fact that the surface of the tires engage both the driver roll and the idler roll, thus reducing the normal tractive force applied to the driver roll. It will be appreciated that under test by virtue of having the driver roll in front of the idler roll, the wheel of the vehicle works its way out of the nip between the two during operation thereby maintaining a substantial tractive effort against the idler roll, which tractive effort is lost from being transferred to the driver roll. Thus, this system does not test the tractor under actual road conditions and the amount of traction that is actually transmitted to the driver roll is severly limited. That is, the transfer of tractive effort to the driver roll is limited by the weight of the vehicle. This limits the horsepower capability of the testing device to low horsepower trucks.

In another system, which I have developed and used, the driver roll is mounted behind the idler roll, and a yoke is provided in front of the idler roll for holding the axle of the truck relative to the frame in which the idler and driver rolls are mounted, thereby obviating the previously-described safety hazard in that the vehicle cannot escape from the testing apparatus during a test. However, it will again be appreciated that during operation the wheel works its way into the idler roll thereby detracting from the overall traction that can be transmitted to the driver roll where it can be measured.

SUMMARY OF THE INVENTION

In the present system a driver roll and an idler roll is provided for each set of wheels on the truck tractor, and the driver roll is mounted behind the idler roll. The driver roll has an 18 inch diameter, whereas the idler roll may have a smaller diameter — of the order of 10 in. to 12 in. The driver and idler rolls for each set of tires are mounted on a common frame, and extending rearwardly of the frame there is a hydraulic cylinder and piston rod unit. A strong steel link chain is provided to connect the movable portion of the hydraulic cylinder and piston rod unit to the fifth wheel of the truck tractor. Prior to operation, the hydraulic unit is energized by an operator to pull the truck backward, thereby simulating actual "fifth wheel" application of the load and causing substantially all of the weight of the truck tractor as well as the applied load to be transmitted to the driver roll and removed from the idler roll. Each idler roll is movable relative to its associated driver roll so that during testing they may be moved out of position to a location at which they do not detract from the traction force applied to the driver roll; and they do not cause a double working of the tires. Normally, some contact will be maintained between the idler roll and the wheel under test so as to stabilize the running vehicle. However, this minimal contact does not diminish the tractive force transmitted to the driver roll and it does not cause a double working of the tire, as with previous systems.

As will be explained in further detail within, during operation, then, as the wheel of the vehicle applies traction to the driver roll, the axle of the vehicle will tend to rotate overcenter about the axis of the driver roll creating a greater applied normal force to the driver roll and thereby assume a more stable position wherein even greater traction effort is transmitted to the driver roll to prevent slippage. In a modification, the angle of load application is controlled to prevent the occurrence of a full overcenter condition.

If the operator is required to apply further tractive load to the vehicle under test, he simply operates a valve to further extend the hydraulic cylinder and piston rod unit which applies additional force for pulling the vehicle into the driver roll. The sets of driver and idler rolls are selectively movable relative to each other over a wide continuous range so as to accommodate a wide range of wheel bases for the vehicles under test.

Other features and advantages of the inventive system will be apparent to persons skilled in the art from the following detailed description of a preferred embodiment wherein identical reference numerals will refer to like elements in the various views.

THE DRAWING

FIG. 1 is a view, taken in horizontal perspective, of the rear portion of a system for measuring tractive power incorporating the present invention prior to installation;

FIG. 2 is a rear upper perspective view of the system of FIG. 1 mounted flush with the floor and illustrating a vehicle under test;

FIG. 3 is a diagrammatic view illustrating the operation of the inventive system;

FIG. 4 is a side elevational view of the system of FIG. 1 showing the placement of driver and idler rolls;

FIG. 5 is a plan view showing the guide means for centering movable chassis on which the rolls are mounted;

FIG. 6 is a cross-sectional view of the rear extension means taken through the sight line 6—6 of FIG. 1;

Figure 7:
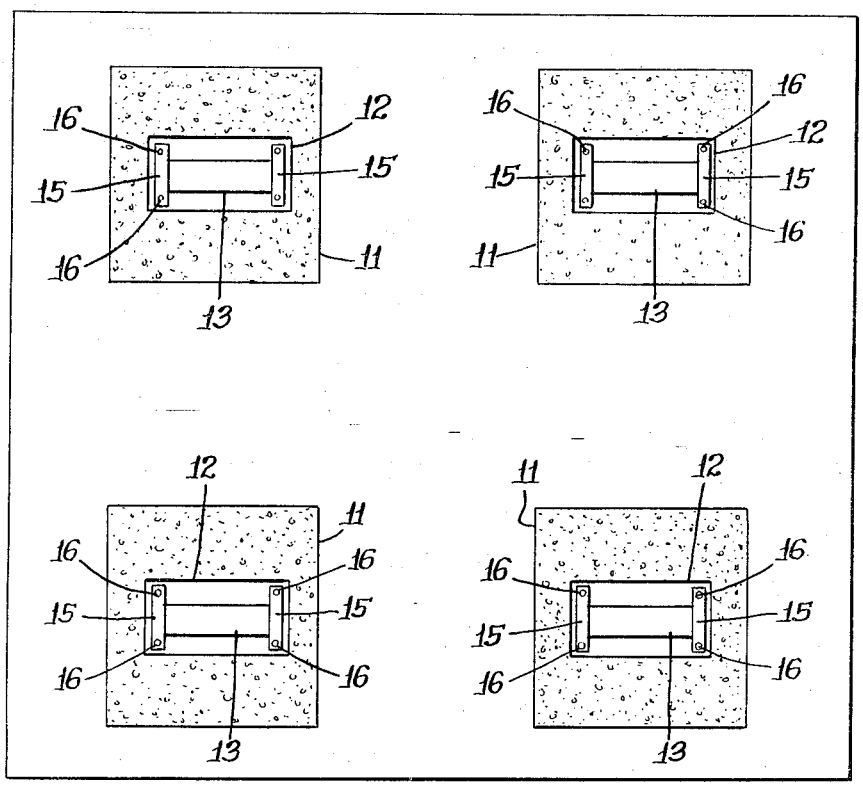
FIG. 7 is a plan view of the base for the frame of the system of FIG. 1.

FIG. 9 is a side elevational view of a portion of a modified system for controlling the angle of load application; and FIGS. 10 and 11 are views taken through the sight line 10—10 and 11—11 respectively of FIG. 9.

DETAILED DESCRIPTION

Turning now to FIG. 1, a rigid frame made from tubular steel members of rectangular cross-section is generally designated by reference numeral 10. The frame 10 is rectilinear in shape, and it may be arranged so that the upper surface of the frame is flush with the surface of the floor in which the system is incorporated or, alternatively, the frame 10 may extend above and be mounted to the upper surface of the floor of the room in which it is installed. It is preferred for long-term permanent installations to mount the upper surface of the frame 10 flush with the floor as shown in FIG. 2 to facilitate backing a truck under test onto the system.

In order to insure a rigid attachment of the frame 10, I prefer to use four concrete bases having a depth of at least about 12 in. which are integral with a thinner concrete floor and spaced apart as designated by reference numeral 11 in FIG. 7. Secured to each of the bases or pads 11 there is a steel mounting plate 12 which is permanently secured to its associated concrete base by means of steel tie rods extending into the concrete. The frame is then attached to the concrete bases by means of transverse steel mounting plates 13 which are secured to their associated base plates 12 by means of side toe straps designated 15, the toe straps 15 being secured to the base plate by means of end bolts 16.

The rear mounting plates 13 are shown in FIG. 1 supporting the frame 10, and to these mounting plates there are bolted two longitudinally extending C-shaped channel support or rail members designated 17, each having an upper and a lower horizontal flange. Although not shown in the drawing, the other ends of the rail members 17 are secured to the forward ones of the mounting plates 13. Transverse tie rods 18 are attached between opposing surfaces of the rails 17 to maintain constant spacing and to accurately align guide rails described below. The upper outwardly extending flanges of the rails 17 receive a transverse steel mounting pad 20 at each end to which the frame 10 is welded. The front of the frame 10 is welded to similar steel pads 20 which are, in turn, similarly secured to the rail members 17. Oversize holes are drilled into channels 17 to allow tie rods 18 to pass through to adjust the spacing of channels 17. This is advantageous in achieving accurate spacing of idler rolls and driver rolls, as will be described.

Figure 8:
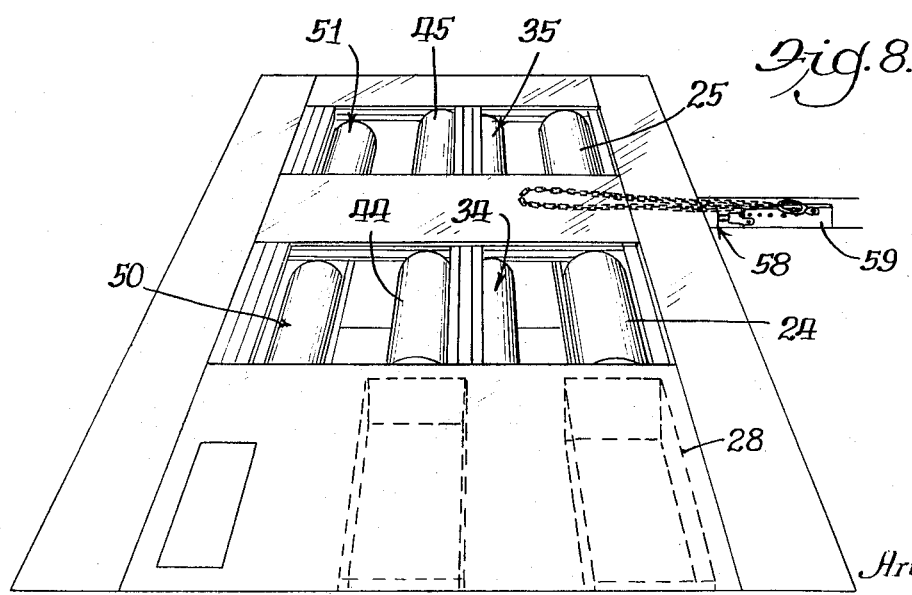
FIG. 8 is an upper perspective view, taken from the side, of the system of FIG. 1 illustrating the movement of the idler rolls.

Turning now to FIGS. 3, 4 and 8, there are a pair of rear drive rollers 24 and 25 (which together may comprise drive roller means) which are rigidly connected to a common drive shaft 26 journaled in suitable bearings, such as the bearing 27 in FIG. 4, for rotation about a horizontal axis extending transverse of the frame 10. The shaft 26 extends parallel to the axle of the vehicle under test, and it is connected at its output end to a power measuring means schematically designated in dashed line at 28 in FIG. 8. There are a number of dynamometers suitable for use with the present invention; however, I prefer to use the unit described in my U.S. Pat. No. 3,068,689, issued Dec. 18, 1962 entitled "Dynamometer and Power Absorption Device."

The bearing housings for the shaft 26 are secured to mounting plates such as the plate 30 in FIG. 4 which receives the housing 27. The plate 30 is welded to the top of a U-shaped chassis 31 which is, in turn, secured by bolts to the frame 10. Thus, the driver rolls 24 and 25 are not movable relative to the frame 10.

Located in front of the driver rolls 24 and 25 is a pair of idler rolls, generally designated by reference numerals 34 and 35. The idler roll 34 is mounted on a shaft 36 which, in turn, is journaled in suitable bearings such as the one designated 37 in FIG. 4. During testing, speed may be measured at the idler rolls, if desired. The bearing 37 is mounted to a plate 38 which is welded to a U-shaped chassis 39. Idler roll 35 is similarly mounted to the chassis 39. The U-shaped chassis 39 may be fabricated, as illustrated, from two angle irons secured together by a bottom plate 40. The chassis 39 is supported by the upper flanges of the rails 17, but is not rigidly secured to them.

A hydraulic cylinder and piston rod unit, generally designated by reference numeral 42 in FIG. 4, has its cylinder end connected to the frame 10 and its rod end connected to an extension 43 welded to the bottom of the plate 40. Extension of the rod of the unit 42 will move the chassis 39 along the upper flanges of the rails 17 to increase the spacing between the set of idler rolls 34, 35 and their associated driver rolls 24, 25. Located in front of the idler rolls 34, 35 is a second set of driver rolls 44 and 45 which are mounted on a common shaft 46 which, in turn, is connected to a dynamometer 47 and rotatably mounted to a chassis 48 in a manner similar to the manner in which the other set of driver rolls is mounted to the chassis 31, as already described. The lower surface of the chassis 48 slides along the upper flanges of the rails 17. Located forwardly of the driver rolls 44, 45 is a second set of idler rolls 50, 51 which are mounted on individual shafts (see shaft 52 for roll 50 which is rotatably mounted to a chassis 53 in a manner already described). The chassis 53 also slides along the upper flanges of the rails 17. A second hydraulic cylinder and piston rod unit generally designated by reference numeral 55 has its cylinder end connected to the frame 10 and its rod end connected to the chassis 53. A third hydraulic cylinder and piston rod unit 56 interconnects the chassis 48 and 53 for determining the spacing between the sets of driver rolls 44, 45 and their associate idler rolls 50, 51. It will be observed that by actuating the hydraulic cylinder and piston rod unit 55 without actuating the unit 56, the forward set of driver rolls and idler rolls will be moved as a unit relative to the rear set; and it is this adjustment that enables the system to accommodate different wheel bases over a continuous range.

Turning now to FIGS. 1, 2, 3 and 8, extending rearwardly from the back side of the frame 10 there is a fourth hydraulic cylinder and piston rod unit generally designated by reference numeral 58 and having its cylinder end directly connected to the frame 10. The rod end of the hydraulic cylinder and piston rod unit is connected to a longitudinally extending plate 59, the lower forward edge of which is connected to a tubular frame member 60 of generally horizontal cross section and telescopically received within a similar tubular frame member 61. The forward end of the tube 61 is directly connected to the frame 10, and the bottom side of the tube 61 is welded to a plate 63 for support. The forward edge of the plate 63 is connected to the frame 10. Thus, when the hydraulic cylinder piston rod unit 58 is actuated the plate 59 is extended rearwardly of the frame 10. Pivotally secured to the plate 59 is a clevis 65 to which is attached a heavy link chain 66. The chain 66 is adapted to be wrapped around and secured to the fifth wheel, generally designated by reference numeral 67 in FIG. 2 of the vehicle under test. It will, therefore, be appreciated that when the hydraulic cylinder and piston rod unit 58 is actuated with the vehicle under test and properly positioned, the rear wheels of the vehicle will be forced into their associated driver rolls and that as much of the vehicle weight as is desired may be removed from the idler rolls.

Turning now to FIG. 5, there is shown the structure which stabilizes the movement of all of the movable chassis, 39, 48 and 53. Between each of the inner opposing vertical surfaces of the rail members 17 there are three longitudinally extending metal bars with rectangular cross sections and located side by side. These bars are designated respectively 70, 71 and 72. The two bars 70 are bolted to the idler chassis 39. The bars 71 are bolted to the idler chassis 53, and the bars 72 are bolted to the driver roll chassis 48.

In a preferred embodiment, the length of each of the bars 70, 71 and 72 is approximately equal to the distance between the center lines of the left and right hand pairs of rails 17. The bars 70–72 are slidable relative to each other and to the rails 17, yet by means of the previously-described tie rods 18, they are maintained snug so that all of the movable chassis remain parallel to each other and to the fixed driver roll chassis 31 during adjustment and during operation.

Turning now to FIG. 9, there is shown a modification of the system described above wherein the truck under test is designated T and a rear driver roll 101 is rotatably mounted within a chassis 102 which is secured to a frame 110. The frame 110 is secured to a concrete base in a manner already described. In front of the driver roll 101 there is mounted an idler roll 105 on a movable chassis 106. Extending rearwardly of the frame 110 is a rigid rectangular brace 111 which is secured at its distal end by means of a clamp generally designated 112 which is bolted to a steel footing 113 (FIG. 10) embedded in the concrete base. A trough designated 115 may be formed in the concrete base rearward of the frame 10 for receiving the brace 111 and its associated anchor member 112.

Slidably mounted on the brace 111 is a carriage 115 having first and second side plates 116 and 117 (see FIG. 11). Rotatably mounted between the side plates 116 and 117 are a left end pair of rollers 118 and 119 located respectively above and below the brace 111, and a right-hand pair of rollers 120 and 121 located respectively above and below the brace 111 so that the carriage 115 is freely movable along the horizontal brace 111. Depending from the carriage 115 is a plate 125 to which is secured the rod end of a hydraulic cylinder and piston rod unit 126. The cylinder end of the unit 126 is secured to a rearwardly-extending plate 127 which is secured to the frame 110.

An extendable jib pole or boom generally designated by reference numeral 130 is pivotally mounted at 131 to the forward end of the movable carriage 115, and it is rotatable about a horizontal axis extending perpendicular to the plane of the page of FIG. 9. The jib pole 130 includes an outer member 132 which telescopically receives an upper member 133 which is provided with a plurality of transverse holes 134 which, when aligned with a similar hole in the outer member 132 and fitted with a pin 135 will maintain the length of the jib pole fixed.

A chain C attached to the fifth wheel of the truck T as already described extends over the upper or distal end of the jib pole 130 and is fixed to a clevis 140 which is rotatably mounted by means of a bolt 141 to the rear end of the carriage 115. When the two-way hydraulic cylinder and piston rod unit 126 is expanded, the carriage 15 moves away from the frame 110 to tension the chain C and draw the truck T into the driver roll 101. The angle at which the chain C draws the truck T is determined by the operator in setting the length and angular disposition of the jib pole 130 for reasons presently to be made clear.

OPERATION

After establishing the truck on the driver rolls so that the axle (or axles) of the truck is substantially parallel with the axis of the driver rolls, the operator secures the chain 66 between the clevis 65 and the fifth wheel of the vehicle under test. It may be desirable, in some cases, to insert a piece of lumber, as at 80 in FIG. 3 to protect the chain from the vehicle frame and to further simulate a horizontal load as would be applied by a loaded trailer being pulled. Next, the operator actuates the rear hydraulic cylinder and piston rod unit 58 to apply load to the tractor and to pull the drive wheels into engagement with their respective driver rolls, 24, 25, 44 and 46. The operator, by actuating a simple push-pull lever may apply as much load as he thinks he may need. At the same time, the wheels of the vehicle under test are drawn away from their respective idler rolls thereby removing weight from them and, further, decreasing the working of the tires during test. If, during the test of a high horsepower vehicle, the operator observes any slippage (which is readily recognizable by an experienced operator), he may simply increase the traction by energizing the cylinder unit 58, thereby withdrawing further weight from the idler rollers and transferring additional traction to the driver rolls. It will be noted that the surface of the tires may not totally disengage the surface of their associated idler rolls because, to some extent, engagement with the idler rolls provides stability to the vehicle under test; nevertheless, the working of the tires is substantially reduced and the amount of traction that is capable of being transmitted to the driver rolls is significantly increased.

One important advantage of the present system is that the application of traction from the truck wheels to the driver rolls is now under control of the operator — he may selectively control the tractive force transmitted to the driver roll by pulling the vehicle into it, and the application of traction is not limited to the weight of the vehicle under test, as with most previous systems.

Turning now to FIG. 3, during operation of the testing system, the wheel of the vehicle under test will be located in the nip or cusp between adjacent idler and driver rolls and turning in a counterclockwise direction, and the driver roll 24 (as well as the other driver rolls) will be turning in a clockwise direction in treadmill fashion. The reaction force tends to cause the vehicle to move forward (i.e. into the cusp); however, it is restrained by the chain. Nevertheless, the vehicle, if it does move slightly, will move such as to rotate the axis 85 of the truck axle to a location 85'. This angular rotation is relative to the axis of the shaft 26 on which the driver roll 24 is mounted. This rotation is schematically illustrated by the arrow 86 in the drawing. Thus, the periphery of the tire will change to that as shown in dashed line. It will be observed that the line of normal force defined by the axis 85 of the vehicle axle and the axis of the shaft 26 moves forward to a position which causes an even greater tensioning of the chain. The tractive force thus increases. In other words, it appears that what may roughly be considered a parallelogram of force moves to a condition in which a greater force component of the traction available at the wheel is transmitted directly to the driver roll 24; and this is considered to be an important advantage of the present invention because the system is designed to move the wheels of the vehicle under test to a location of more efficient transmission of traction to the driver roll as the torque increases.

In the modification of FIGS. 9-11, the positioning of the chain is controllable so that the axis of the truck wheel does not reach an over center condition relative to the axis of the driver roll and thereby apply too great a tension to the chain. The modification gives greater flexibility in setting up tests with different size vehicles and different types of vehicles, if desired.

With the present invention, it will be appreciated that the forward thrust of the tractor is applied to the wheel suspension system, exactly as it occurs on the highway. Further, by removing the weight of the vehicle from the idler roll and applying it to the driver roll, smaller idler rolls may be used. For example, in a preferred embodiment, the idler rolls are 12 inches in diameter whereas the driver rolls are 18 inches in diameter.

The smaller idler rolls provide for a greater maneuverability, and they permit the forward motion of the axis of the tires under test to increase the tension on the chain and thereby increase the traction applied to the driver roll. That is, additional traction is provided, as needed because of the geometrical stability of the arrangement and the smallness and maneuverability of the idler roll. Further, by adjusting the idler roll relative to its associated driver roll double working of the tires of the vehicle is really reduced. In addition, the smaller idler roll and the relative position assists in getting the vehicle on and off the testing apparatus, particularly in those instances wherein the vehicle must be driven forwardly onto the test set up, as distinguished from backing the vehicle onto the testing apparatus. The inclusion of the idler roll enhances the safety of the testing device in providing an obstacle over which the vehicle must travel in escaping. By making the spacing between an idler roll and a driver roll adjustable, the usage of the testing system is expanded by being able to test vehicles with small tires, as well as vehicles with large tires.

Having thus described in detail a preferred embodiment of the present inventive system, persons skilled in the art will be able to modify certain of the structure which has been illustrated and to substitute equivalent elements for those which have been described; and it is, therefore, intended that all such modifications and substitutions be covered as they are embraced within the spirit and scope of the appended claims.

I claim:

1. In a system for testing the power of a vehicle having drive wheel means, the combination of a frame adapted to support said drive wheel means, driver roll means rotatably mounted to said frame behind said drive wheel means when said vehicle is placed on said frame for test, said driver roll means being rotatable about an axis parallel to the axis of rotation of said drive wheel means and adapted to engage said drive wheel means under test, power means including link means connecting said vehicle to said frame at a point on said frame located rearward of said driver roll means for pulling said vehicle rearward whereby the drive wheel means thereof are forced into engagement with said driver roll means for controlling traction between the two, and power measuring means connected to said driver roll means for measuring the power transmitted thereto from the drive wheel means of said vehicle whereby as the load on said vehicle is increased, said vehicle will move forwardly of said driver roll means and thereby further increase the traction between the drive wheels of the vehicle under test and said driver roll means.

2. In the system of claim 1 further comprising idler roll means associated with said driver roll means and rotatably mounted to said frame for rotation about an axis parallel to the axis of rotation of said driver roll means and located in front of the same to define a cusp for receiving the drive wheel means of said vehicle, said power means being actuatable to force said drive wheel means into engagement with said driver roll means of said frame and to remove at least some of the weight of said vehicle from said idler roll means.

3. The system of claim 2 further comprising hydraulic power means for selectively moving said idler roll means relative to said driver roll means to set the spacing therebetween.

4. The system of claim 1 wherein said link means includes a flexible link attachable between the distal end of said power means and the fifth wheel of the vehicle under test.

5. The system of claim 1 wherein said power means includes carriage means movable under power relative to said frame, an extendable boom rotatably mounted to said carriage at an intermediate location and extending upward thereof, and a flexible link securable at one end to the vehicle under test and extending over said boom and mounted at the other end to the distal end of said carriage thereby to permit control of the minor acute angle of the application of a pulling load to the vehicle under test.

6. A system for testing the horsepower of a truck tractor having a plurality of drive axles with wheels secured to each axle, comprising cylindrical driver roll means and cylindrical idler roll means for each axle, said driver roll means and said idler roll means being rotatably mounted to said frame for rotation about an axis parallel to the axle of said tractor and spaced to define a cusp for receiving the wheels of said tractor, a first hydraulic cylinder and piston rod unit extending rearwardly of said frame and including a distal end movable when said unit is actuated, flexible link means interconnecting said distal end of said unit with said truck whereby when said unit is actuated said truck will be pulled rearwardly and thereby transmit a greater normal force to said driver roll means than is capable of being transmitted only by the weight of said vehicle while removing at least some of the weight of said vehicle from said idler roll means, and means for measuring the tractive power transmitted from the wheels of the vehicle to said driver roll means while said truck is being driven.

7. The system of claim 6 further comprising means for moving said driver roll means relative to each other to accommodate trucks of different wheel base.

8. The system of claim 7 further comprising a second and a third hydraulic cylinder piston rod unit for interconnecting respectively each of the sets of driver roll means and idler roll means for selectively determining the spacing between each set.

9. The system of claim 8 further including a plurality of longitudinally extending support rail members each defining an upper flange, first chassis means slidably received on said rail members for rotatably supporting said idler roll means associated with one set of idler rolls, second chassis means slidably supported on said longitudinally extending rail members for rotatably supporting the other driver roll means, and third chassis means slidably received on said rail members for rotatably supporting said second idler roll means, said second piston rod unit being connected between said second and third chassis to determine the spacing between said second idler roll and said second driver roll, said third cylinder and piston rod unit being connected to determine the spacing between said driver roll means, and further including a fourth hydraulic cylinder and piston rod unit connected between the first chassis and said frame for determining the spacing between said first driver roll means and said first idler roll means.

10. In a method for measuring the power of a vehicle having a set of drive wheels, the steps comprising: placing the drive wheels of the vehicle in a cusp between a forward idler roll and a rear driver roll, exerting a rearward pulling force on the vehicle to increase the normal force on the driver roll while reducing the force on the idler roll to thereby control the amount of traction between the drive wheels of the vehicle and the driver roll, and then driving the vehicle while measuring the horsepower transmitted from the drive wheels to the driver roll, whereby under greater loading of the drive wheels, the vehicle under test will move to a position of greater traction transferred to said driver roll.

11. The method of claim 10 wherein said step of exerting said rearward force includes pulling the vehicle with a flexible link at a minor acute angle relative to the vertical, whereby as said truck moves forwardly under greater load applied to said driver roll, the angle defined by a line drawn between the axis of rotation of said driver roll and the axis of rotation of the drive wheels of the vehicle will become more equal to said minor acute angle of pulling and thereby increase the traction between the vehicle wheels and said driver roll.

12. The system of claim 10 further comprising the step of increasing the distance between said idler roll and said rear driver roll during vehicle test as the amount of applied load is increased to reduce double working of the vehicle wheels and to enhance traction between the vehicle drive wheels and the driver roll.

* * * * *